United States Patent
Gokmen et al.

(10) Patent No.: US 10,839,292 B2
(45) Date of Patent: Nov. 17, 2020

(54) ACCELERATED NEURAL NETWORK TRAINING USING A PIPELINED RESISTIVE PROCESSING UNIT ARCHITECTURE

(71) Applicant: INTERNATIONAL BUSINESS MACHINES CORPORATION, Armonk, NY (US)

(72) Inventors: Tayfun Gokmen, Briarcliff Manor, NY (US); Yurii A. Vlasov, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

(21) Appl. No.: 15/196,350

(22) Filed: Jun. 29, 2016

(65) Prior Publication Data

US 2018/0005115 A1    Jan. 4, 2018

(51) Int. Cl.
*G06N 3/08*    (2006.01)
*G06N 3/063*    (2006.01)

(52) U.S. Cl.
CPC ........... *G06N 3/084* (2013.01); *G06N 3/0635* (2013.01)

(58) Field of Classification Search
CPC ............................. G06N 3/084; G06N 3/0635
See application file for complete search history.

(56) References Cited

U.S. PATENT DOCUMENTS

| | | | | | |
|---|---|---|---|---|---|
| 4,874,963 | A | * | 10/1989 | Alspector | G06N 3/0635 706/34 |
| 5,422,982 | A | * | 6/1995 | Pernisz | G06N 3/063 706/33 |
| 5,857,178 | A | * | 1/1999 | Kimura | G06N 3/084 706/41 |
| 6,463,438 | B1 | * | 10/2002 | Veltri | G06K 9/0014 706/15 |
| 9,466,362 | B2 | * | 10/2016 | Yu | G11C 13/0026 |
| 9,792,547 | B2 | * | 10/2017 | Nishitani | G06N 3/084 |

(Continued)

OTHER PUBLICATIONS

Raqibul Hasan and Tarek M. Taha, "Enabling Back Propagation Training of Memristor Crossbar Neuromorphic Processors", 2014, IEEE, 2014 International Joint Conference on Neural Networks (IJCNN), p. 21-28. (Year: 2014.*

(Continued)

*Primary Examiner* — Vincent Gonzales
*Assistant Examiner* — Imad Kassim
(74) *Attorney, Agent, or Firm* — Cantor Colburn LLP; Rabin Bhattacharya

(57) ABSTRACT

A neural network system comprises a plurality of neurons, comprising a layer of input neurons, one or more layers of hidden neurons, and a layer of output neurons. The system further comprises a plurality of arrays of weights, each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances. The system includes a neuron control system configured to control an operation mode of each of the plurality of neurons, wherein the operation mode comprises: a feed forward mode, a back propagation mode, and a weight update mode.

20 Claims, 10 Drawing Sheets

(56) References Cited

U.S. PATENT DOCUMENTS

| | | | | |
|---|---|---|---|---|
| 2008/0319933 | A1* | 12/2008 | Moussa | G06N 3/063 |
| | | | | 706/31 |
| 2010/0223220 | A1* | 9/2010 | Modha | G06N 3/0635 |
| | | | | 706/33 |
| 2014/0142929 | A1 | 5/2014 | Seide et al. | |
| 2015/0019214 | A1 | 1/2015 | Wang et al. | |
| 2015/0039545 | A1* | 2/2015 | Li | G05B 13/027 |
| | | | | 706/23 |
| 2015/0269483 | A1* | 9/2015 | Nishitani | G06N 3/084 |
| | | | | 706/25 |
| 2016/0307071 | A1* | 10/2016 | Perronnin | G06K 9/4628 |
| 2017/0293543 | A1* | 10/2017 | Xu | G06F 11/008 |
| 2018/0005115 | A1* | 1/2018 | Gokmen | G06N 3/084 |
| 2018/0039881 | A1* | 2/2018 | Frank | G06N 3/084 |

OTHER PUBLICATIONS

Shyam Prasad Adhikari, Hyongsuk Kim, Ram Kaji Budhathoki, Changju Yang, and Leon O. Chua, "A Circuit-Based Learning Architecture for Multilayer Neural Networks With Memristor Bridge Synapses", Jan. 2015, IEEE Transactions on Circuits and Systems-I: Regular Papers, vol. 62, No. 1. pp. 215-223.*

Bastien et al. "Theano: New Features and Speed Improvements," arXiv preprint arXiv:1211.5590, Dept. IRO, Universite de Montreal, Montreal (QC), H3C 3J7, Canada, Nov. 23, 2012, pp. 1-10.

Chen et al. "Pipelined Back-Propagation for Context-Dependent Deep Neural Networks," Interspeech, 2012, pp. 1-4.

Hannun et al. "Deep Speech: Scaling Up End-to-End Speech Recognition," arXiv preprint arXiv:1412.5567, Baidu Research—Silicon Valley AI Lab, Dec. 19, 2014, pp. 1-12.

Jaitly et al. "Application of Pretrained Deep Neural Networks to Large Vocabulary Speech Recognition," Interspeech. 2012, pp. 1-4.

Li et al, "Context-Dependent Deep Neural Networks for Audio Indexing of Real-Life Data." Spoken Language Technology Workshop, SLT 2012 IEEE. IEEE, 2012, pp. 143-148.

Miao et al., "EESEN: End-to-End Speech Recognition using Deep RNN Models and WFST-Based Decoding." arXiv preprint arXiv:1507.08240, Oct. 18, 2015, pp. 1-8.

* cited by examiner

ACCELERATED NEURAL NETWORK TRAINING USING A PIPELINED RESISTIVE PROCESSING UNIT ARCHITECTURE

BACKGROUND

The present invention generally relates to neural network hardware, and more particularly to neural network training using a pipelined neural network hardware having resistive processing unit.

Deep Neural Networks (DNNs) demonstrated significant commercial success in recent years with performance exceeding sophisticated prior methods in speech and object recognition. However, training DNNs is a computationally intensive task that requires massive computational resources and enormous training time that hinders their further application. For example, a DNN with 1 billion connections that was trained on a cluster with 1000 machines for three days. Training a DNN relies in general on the backpropagation algorithm that is intrinsically local and parallel. It is desirable to exploit hardware approaches that are more efficient in data processing to accelerate the neural network training.

SUMMARY

According to an embodiment of the present invention, a neural network system comprises a plurality of neurons, comprising a layer of input neurons, one or more layers of hidden neurons, and a layer of output neurons. The system further comprises a plurality of arrays of weights, each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances. The system includes a neuron control system configured to control an operation mode of each of the plurality of neurons, wherein the operation mode comprises: a feed forward mode, a back propagation mode, and a weight update mode.

According to another embodiment of the present invention, a method of performing neural network training comprises initializing a neural network hardware having a plurality of neurons, a plurality of arrays of weights, and a neuron control system, wherein the plurality of neurons comprises a layer of input neurons, one or more layers of hidden neurons, and a layer of output neurons, and each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances. At each of the plurality of neurons, a sequence of discrete data points is received. One discrete data point is received during each of a plurality of operation cycles, wherein the discrete data point comprises an input current from an input of the neuron, and an output voltage pulse at an output of the neuron. The neuron control system sends a control signal to each of the plurality of neurons based on a location of the neuron and a discrete data point associated with the neuron at the operation cycle to control an operation mode of the neuron, wherein the operation mode of the neuron comprises a feed forward mode, a back propagation mode and a weight update mode. Computations are performed at each of the plurality of neurons during the operation cycle to produce an output data point of the neuron. An iteration of neural network training is completed when each of the sequence of discrete data points at each of the layer of input neurons has been processed through feed forward operation, back propagation operation, and weight update operation. The neural network training is completed when a predetermined termination condition is met.

According to yet another embodiment of the present invention, a computer program product comprising a computer readable storage medium having program instructions embodied therewith, the program instructions executable by a processor to cause the processor to perform a method that comprises initializing a neural network hardware having a plurality of neurons, a plurality of arrays of weights, and a neuron control system, wherein the plurality of neurons comprises a layer of input neurons, one or more layers of hidden neurons, and a layer of output neurons, and each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances. At each of the plurality of neurons, a sequence of discrete data points is received. One discrete data point is received during each of a plurality of operation cycles, wherein the discrete data point comprises an input current from an input of the neuron, and an output voltage pulse at an output of the neuron. The neuron control system sends a control signal to each of the plurality of neurons based on a location of the neuron and a discrete data point associated with the neuron at the operation cycle to control an operation mode of the neuron, wherein the operation mode of the neuron comprises a feed forward mode, a back propagation mode and a weight update mode. Computations are performed at each of the plurality of neurons during the operation cycle to produce an output data point of the neuron. An iteration of neural network training is completed when each of the sequence of discrete data points at each of the layer of input neurons has been processed through feed forward operation, back propagation operation, and weight update operation. The neural network training is completed when a predetermined termination condition is met.

DETAILED DESCRIPTION

Conventionally, the neural network training is performed one iteration at a time and only one of the neurons is actively involved in a feed forward process, a back propagation process, and a weight update process of the iteration of the neural network training. All other neurons in a chain of the feed forward process, the back propagation process, and the weight update process are idle. The present embodiments include a method of neural network training using a neural network hardware having a pipelined resistive processing unit architecture to accelerate the neural network training. The present description will now be described more fully hereinafter with reference to the accompanying drawings FIGS. 1-7, in which certain exemplary embodiments of the present description are shown. Embodiments may be embodied in many different forms and should not be construed as limited to the embodiments set forth herein; rather, these embodiments are provided so that this invention will be thorough and complete, and will fully convey the scope of the invention to those skilled in the art.

Figure 1:
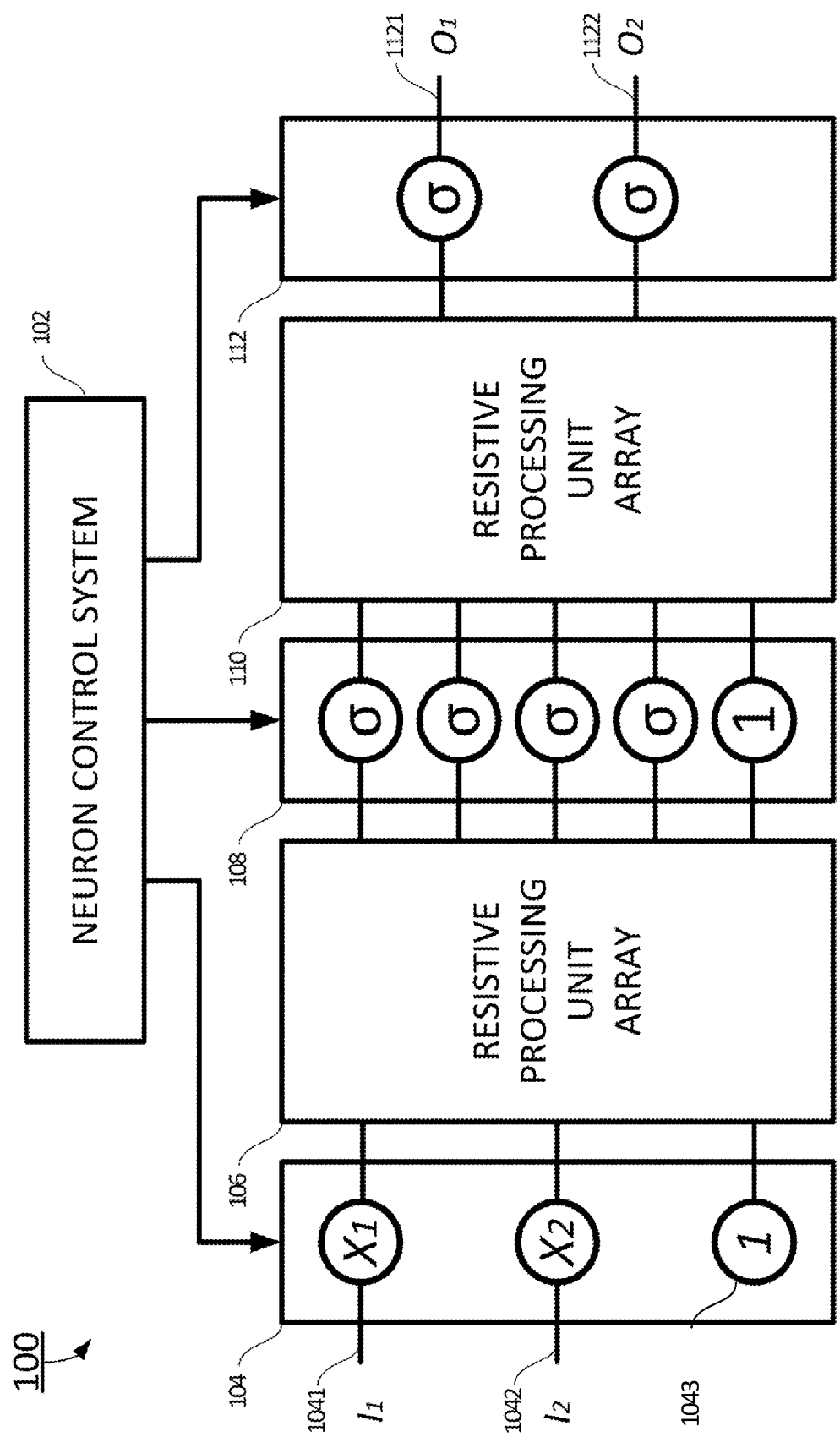
FIG. 1 shows a block diagram of a neural network hardware having one or more arrays of resistive processing units.

The embodiments described herein include a neural network hardware 100 having one or more arrays of resistive processing units as shown in FIG. 1 according to certain embodiments. In one embodiment, the neural network hardware 100 may include a set of input neurons 104, one or more sets of hidden neurons 108, one or more arrays of resistive processing units 106, and 110, a set of output neurons 112 and a neuron control system 102. In one embodiment as shown in FIG. 1 for simplicity, the input neurons 104 may include a unit neuron 1043, a first input neuron 1041 electrically coupled to a first input signal I1, and a second input neuron 1042 electrically coupled to a second input signal I2. In other embodiments, the input neurons 104 may include many more neurons 104N, where N is a positive integer. The output neurons 112 may include a first output neuron 1121 electrically coupled to a first output signal O1, and a second output neuron 1122 electrically coupled to a second output signal O2. Similar to the input neurons 104, the output neurons 112 may include many more neurons 112M, where M is a positive integer. In certain embodiments, the N may be the same as M. In other embodiments, the N may be different from M.

In certain embodiments, the hidden neurons 108 may include one layer of hidden neurons as shown in FIG. 1. In other embodiments, the hidden neurons 108 may include several layers of hidden neurons 108. As shown in FIG. 1, the array of resistive processing units 106 is interconnected with the input neurons 104 and the hidden neurons 108. The array of resistive processing units 110 is interconnected with the hidden neurons 108 and the output neurons 112. In other embodiments, the neural network hardware 100 may include more than one layer of hidden neurons, and the resistive processing unit arrays 106, 110 and more may be interconnected to the input neurons, one or more layers of hidden neurons and the output neurons 112 in similar manner as shown in FIG. 1.

In certain embodiments, each of the input neurons, the hidden neurons, and the output neurons may include: a feed forward chain configured to apply a computation based on an input data point from an input of the neuron, and to produce a result of the computation as an output data point at an output of the neuron, a back propagation chain configured to apply a computation based on an error data point and a derivative of the computation of the feed forward chain from an input and to produce an error data point at an output, and one or more weight update generators configured to produce a weight update data point in accordance with a local error value.

In certain embodiments, each of the input neurons, the hidden neurons, and the output neurons is associated with a data point, and the associated data point is currently processed by the neuron. Each data point may include an input current from the input, and an output voltage pulse at the output. In certain embodiments, the input current is compared to a reference current to determine a sign and magnitude of an input to the computation.

In certain embodiments, one or more of the input neurons and hidden neurons is a constant neuron configured to provide a constant voltage output during feed forward operation.

Figure 2:
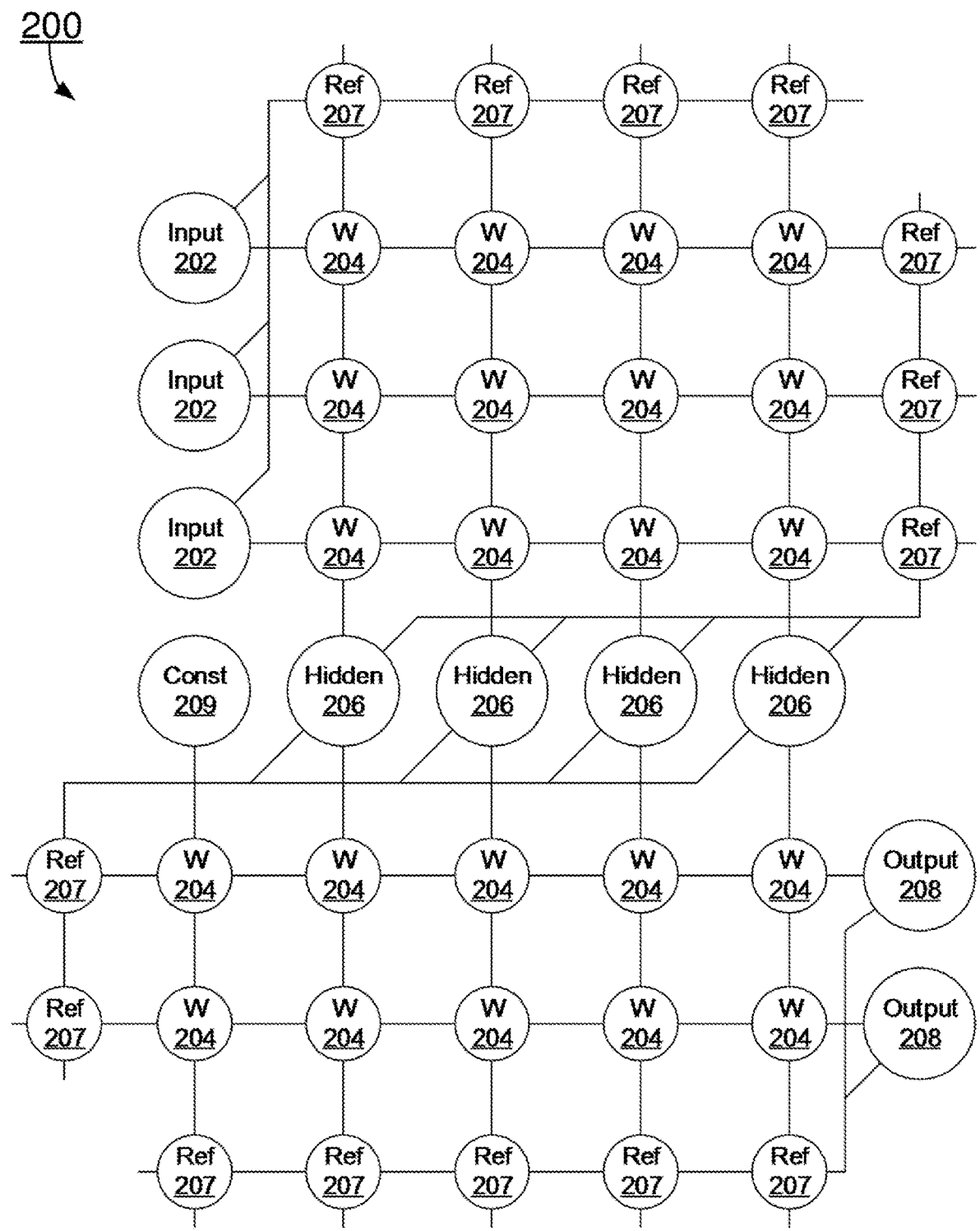
FIG. 2 illustrates interconnection of neurons of the neural network hardware including arrays of weights according to an embodiment.

Referring now to FIG. 2, a neural network hardware architecture 200 is shown according to certain embodiments. During feed-forward operation, each of a set of input neurons 202 sends a corresponding input voltage in parallel to a respective row of weights 204. Each of the weights 204 has a settable resistance value, such that a current output flows from the weight 204 to a respective hidden neuron 206 to represent the weighted input. The current output by a given weight is determined as $I=V/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. In certain embodiments, each array of weights may include one or more reference weights having a static resistance.

As an alternative to using the reference weights 207, another embodiment may use separate arrays of weights 204 to capture negative values. Each approach has advantages and disadvantages. In certain embodiments, using the reference weights 207 is more efficient in chip area, but reference values need to be matched closely to one another. In other embodiments, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

In certain embodiments, during back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

In certain embodiments, during weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
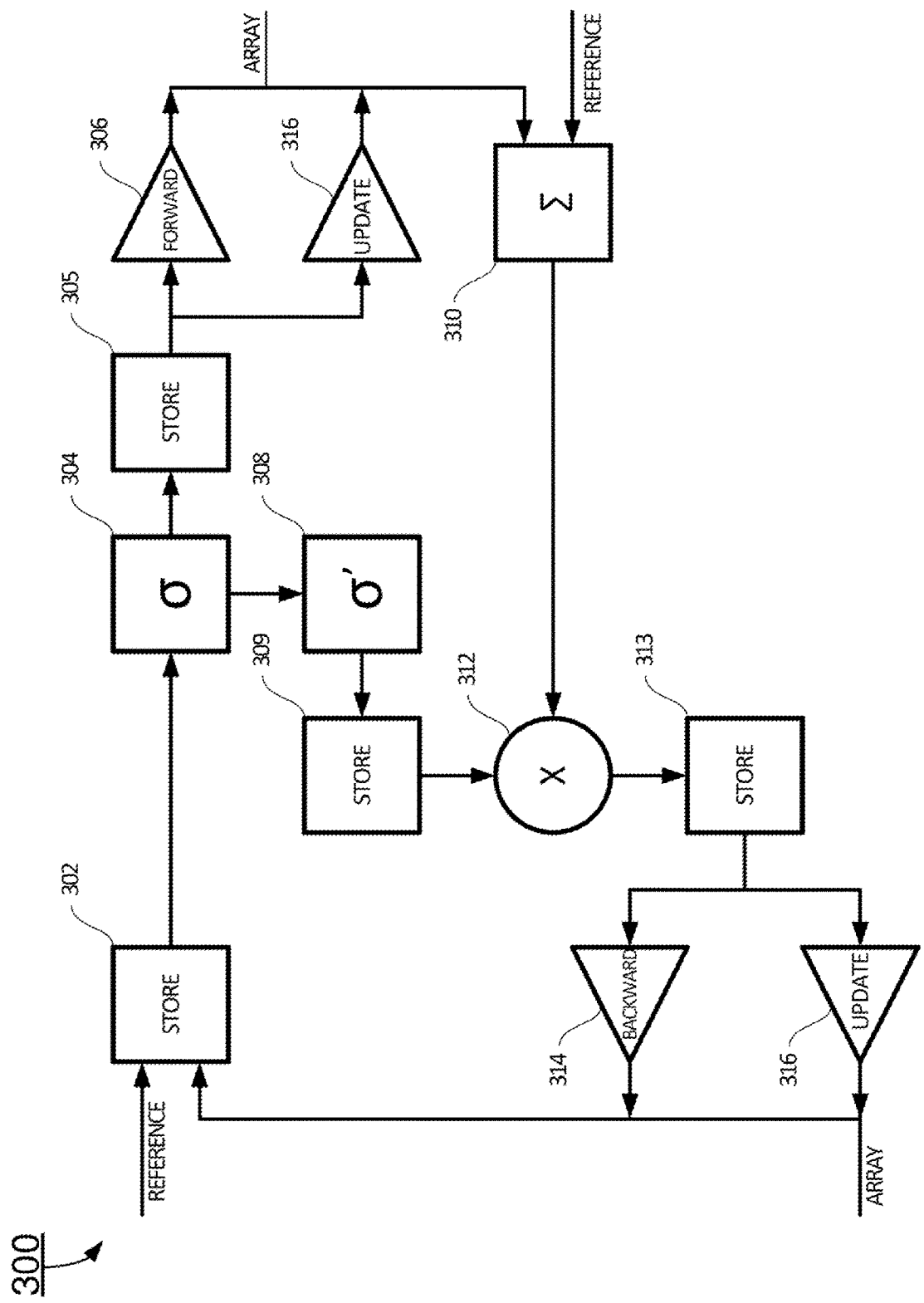
FIG. 3 is a block diagram of a neuron in the neural network hardware according to certain embodiments.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes. In certain embodiments, the neuron control system 102 may provide the control to switch between three different modes.

In certain embodiments, when the neuron 300 is in feed forward mode, a difference block 302 determines the value of the input from the array by comparing it to a reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final layer of the output neurons. The input is also applied to a derivative of the non-linear function in block 308, the output of which is stored in memory 309.

In certain embodiments, when the neuron 300 is in back propagation mode, an error signal is generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the layer of input neurons 202.

In certain embodiments, when the neuron 300 is in weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In general terms, the weights 204 are implemented as resistive cross point devices, where their switching characteristics have a non-linearity that can be used for processing data. The weights 204 belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. The RPU devices may also be considered as memristive systems, but they differ in their principle of operation as compared to an ideal memristor.

In certain embodiments, the update generators 316 generate the voltage pulses that are applied to the two-dimensional array of weights 204 in parallel. These circuits generate independent bit streams called stochastic numbers, where the probability of a "one" in the stream is proportional to the number that is encoded.

Figure 4:
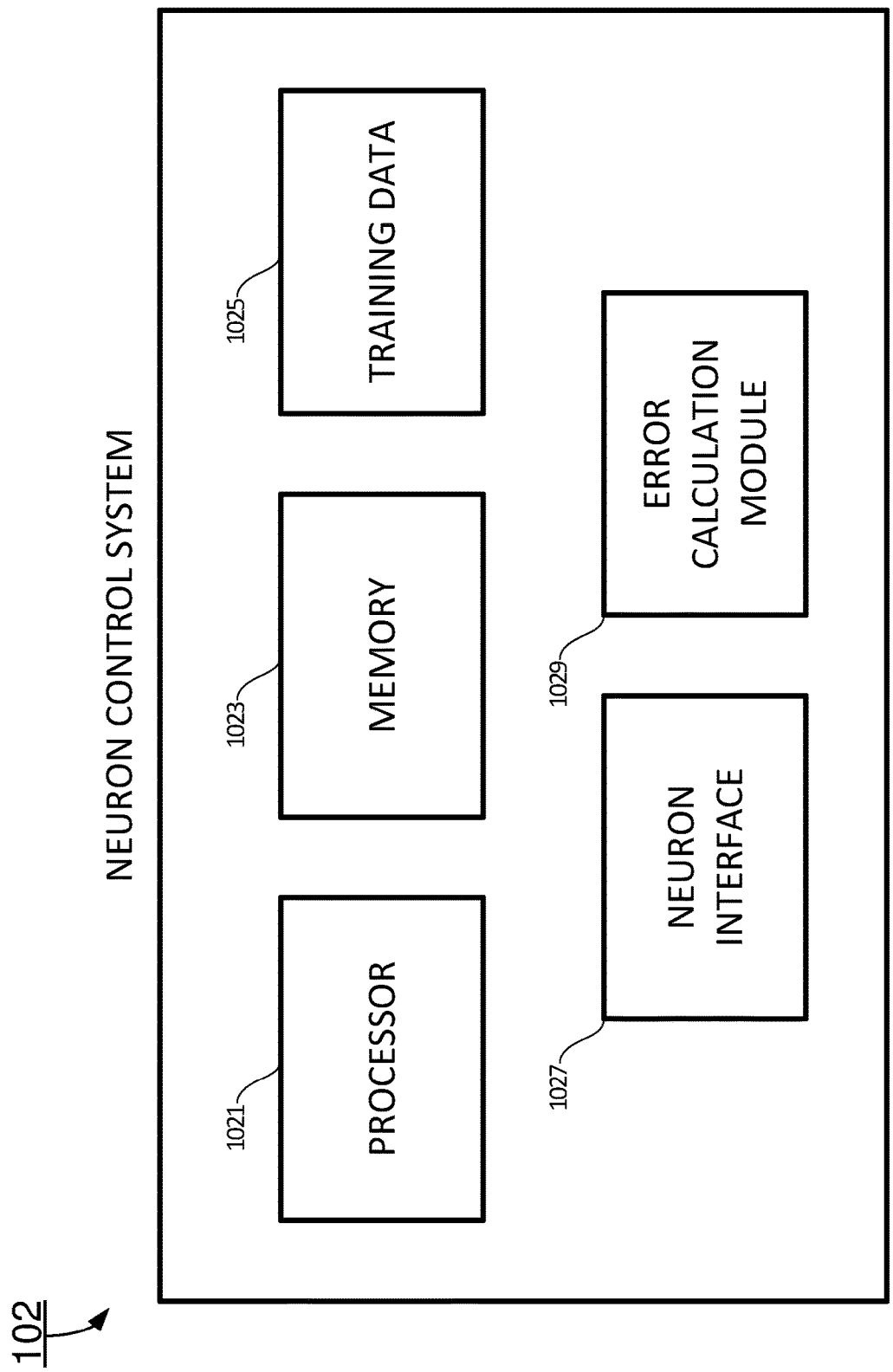
FIG. 4 is a block diagram of a neuron control system for the neural network hardware according to certain embodiments.

Referring FIG. 4, a block diagram of a neuron control system 102 for the neural network hardware 100 is shown according to certain embodiments. The neuron control system 102 may include a processor 1021, a memory 1023, a set of training data 1025, a neuron interface 1027, and an error calculation module 1029. The processor 1021 may be used to control operations of each and every neuron in the neural network hardware 100. In certain embodiments, the processor 1021 may include one or more central processing units. In certain embodiments, the processor 1021 may include one or more cores. In one embodiment, the processor 1021 may include a reduced instruction set computer (RISC) microprocessor. The processors 1021 are coupled to the memory 1023 and various other components via a system bus (not shown in FIG. 4). Certain Read only memory (ROM) (not shown in FIG. 4) may be coupled to the system bus and may include a basic input/output system (BIOS), which controls certain basic functions of the neuron control system 100.

In certain embodiments, the neuron control system 102 may perform following operations: placing a neuron in the feed forward mode when the neuron is an input neuron, or the neuron receives the associated data point in a feed forward chain, placing a neuron in the back propagation mode when the neuron is an output neuron, or the neuron receives the associated data point in a back propagation chain, and placing a neuron in the weight update mode when the neuron is an input neuron and the neuron receives the associated data point in a back propagation chain.

In certain embodiments, the set of training data 1025 for the neural network hardware 100 is stored in a portion of the memory 1023 and is used to train weights of the neural network hardware 100. The neuron interface 1027 controls neurons on the neural network hardware 100, determining whether the neurons are in feed forward mode, back propagation mode, or weight update mode. The neuron interface 1027 furthermore provides inputs to input neurons and receives the output from output neurons. The error calculation module 1029 compares the outputs from the neurons to training data 1025 to determine an error signal. The neuron interface 1027 applies the error signal to the output neurons during a back propagation mode and subsequently triggers a weight update mode to train the weights of the neural network hardware 100 accordingly.

In one embodiment, the input to the input neurons may be analog voltage. In another embodiment, the input to the input neurons may be discrete voltage in digital form. In yet another embodiments, the input to each of the input neurons may be a series of digital data points, $D_1, D_2, D_3, \ldots,$ and $D_N$, where N is a positive integer.

Figure 5:
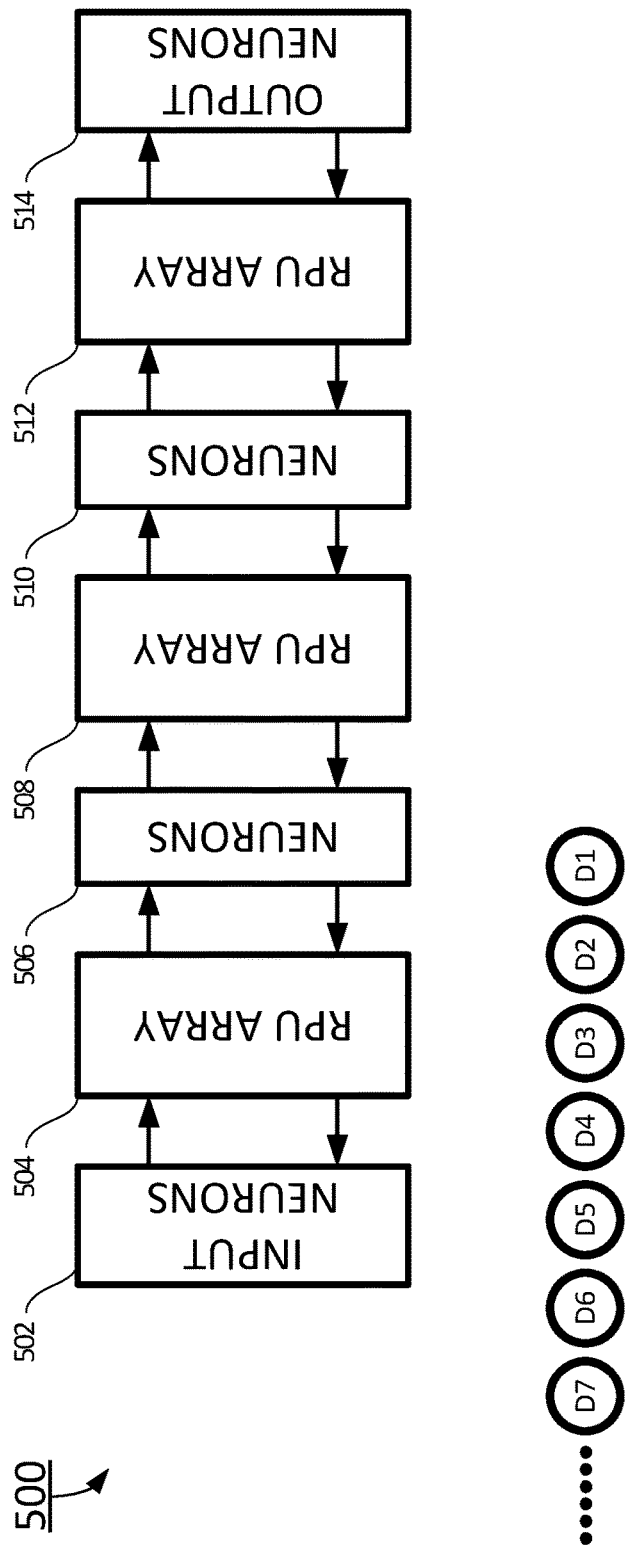
FIG. 5 illustrates a deep neural network hardware having several hidden layers of neurons and several arrays of resistive processing units according to certain embodiments.
Figure 5:
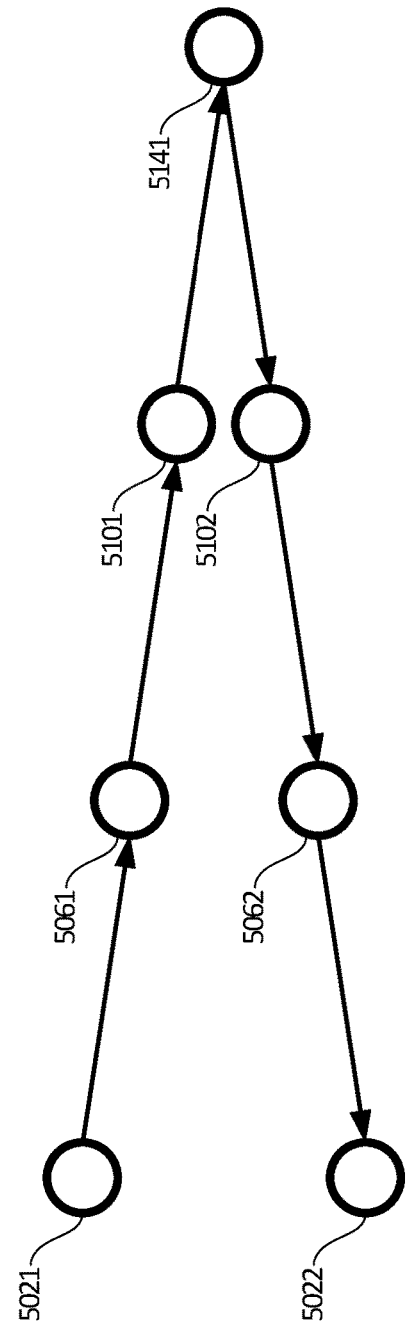
Figure 5:

Referring now to FIG. 5, a neural network hardware 500 having several hidden layers of neurons and several arrays of resistive processing units is shown according to certain embodiments. The neural network hardware 500 have a set of input neurons 502, two sets of hidden neurons 506 and 510, one set of output neurons 514, and three arrays of resistive processing units (RPU). Inputs to a first input neuron 5021 are shown as a sequence of data points: D1, D2, D3, ..., DN, where N is a positive integer. At the start of neural network training, conventionally, the each data point D1, D2, D3, ..., DN is fed to the first neuron 5021 one at a time. At the control of the neuron control system 102, a first data point D1 is sent to the first neuron 5021 through the neuron interface 1027, and the input neuron 5021 is in a feed forward mode. The first data point D1 is moved from input neuron 5021 through the first RPU array 504 to a hidden neuron 5061. Then first data point D1 is moved from the hidden neuron 5061 through the second RPU array 508 to another hidden neuron 5101, and then moved from the hidden neuron 5101 through the third RPU array 512 to the output neuron 5141. With two layers of hidden neurons 506 and 510, it takes three feed forward cycles to move the first data point to the output neuron 5141. Once the D1 reaches the output neuron 5141, the neuron control system 102 may switch to back propagation mode such that output from the output neuron 5141 may be compared with training data at the output neuron 5141 and obtain an error for back propagation.

In certain embodiments, the first data point D1 may move backward from the output neuron 5141 to the second hidden neuron 5102 through the third RPU array 512, to the first hidden neuron 5062 through the second RPU array 508, and finally reaches the first input neuron 5022. It takes three back propagation cycles to move the first data point D1 to the input neuron 5022. Then the neuron control system 102 may switch to weight update mode such that weight is updated after the first data point D1 reaches the input neuron 5022 through back propagation.

In certain embodiments, the feed forward cycle, back propagation cycle, and the weight update cycle may be collectively called neural network operation cycle. Therefore, it takes about 7 operation cycles to complete one iteration of neural network training. In one embodiment, the neural network operation cycle may be about 80 nanoseconds long. In other embodiments, the weight update cycle may be 20 nanoseconds long.

In certain embodiments, throughout the progression of the first data point D1, all but one of the neurons is actively engaged with the neural network training, and all other neurons are idle. Therefore resources of the neural network were not fully and efficiently utilized.

In certain embodiments, each of the one or more layers of hidden neurons is configured to produce a weight update voltage pulse to an array of weights in a forward direction and an array of weights in a backward direction. The weight update voltage pulse may include a stochastic number encoded as a voltage pulse that has a magnitude of about half of a voltage needed to change the settable resistance of a resistive processing unit. The weight update voltage pulses from two neurons may converge on a resistive processing unit during weight update mode and change the settable resistance of the resistive processing unit in proportion to a number of points in the respective stochastic numbers that both have a high voltage magnitude.

In another aspect, alternate exemplary embodiments include a method of pipelined neural network training as shown in FIGS. 6A-6H.

Figure 6A:
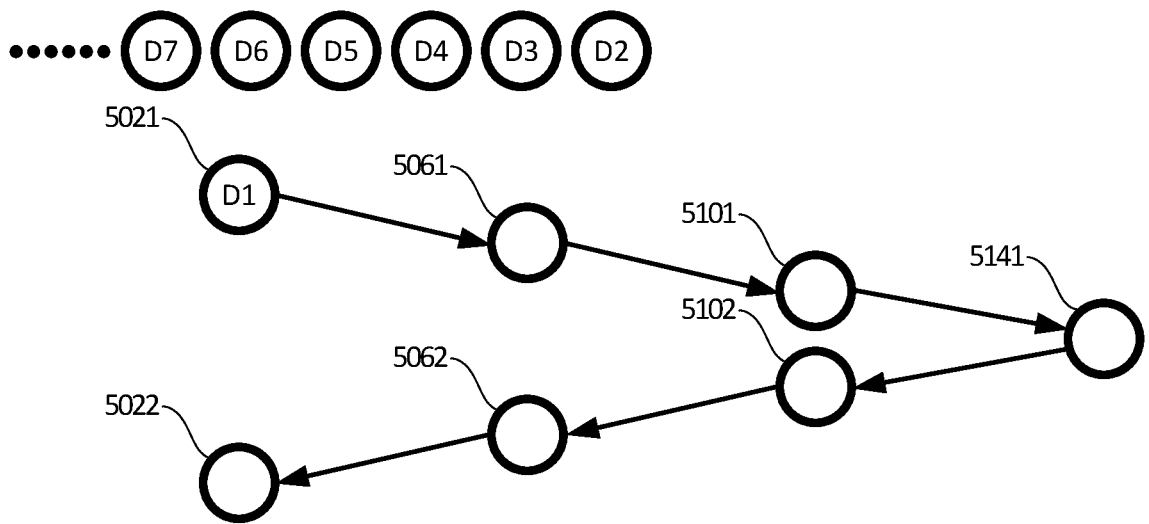
FIGS. 6A-6H illustrate a method of pipelined architecture with resistive processing units for neural network training according to certain embodiments.

As shown in FIG. 6A, at the start of neural network training, the first data point D1 is fed to the first input neuron 5021.

In certain embodiments, in order to allow each neuron to simultaneously processing feed forward, back propagation, and weight update, each of the neurons may include a storage for storing data point in feed forward operation, a storage for storing data point in back propagation operation, and a storage for storing data point in weight update operation.

Figure 6B:
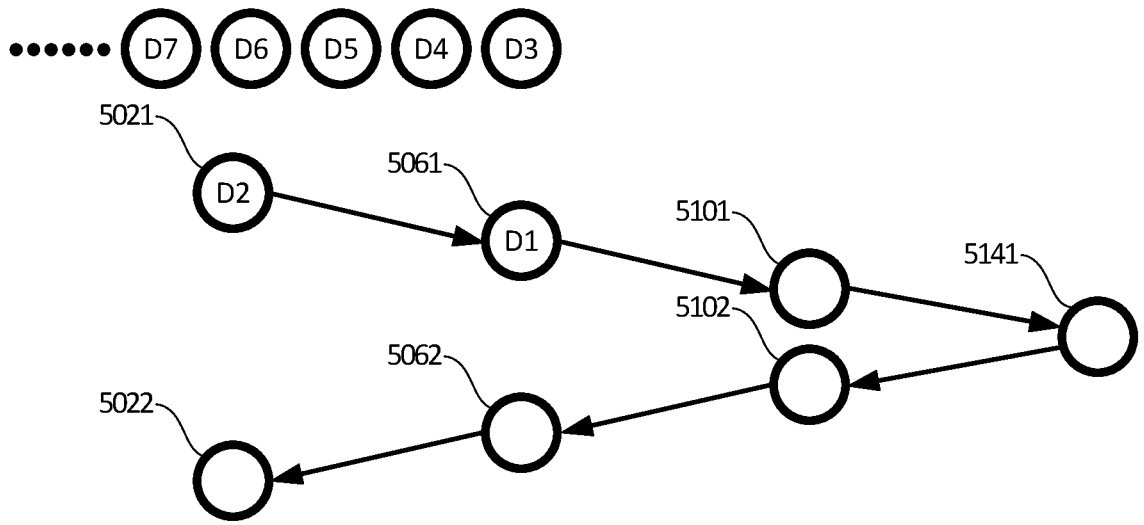

After a first operation cycle, as shown in FIG. 6B, the first data point D1 may move forward from the first input neuron 5021 to the first hidden neuron 5061 through the first array of RPU 504. At the same time, the second data point D2 is fed to the first input neuron 5021.

Figure 6C:
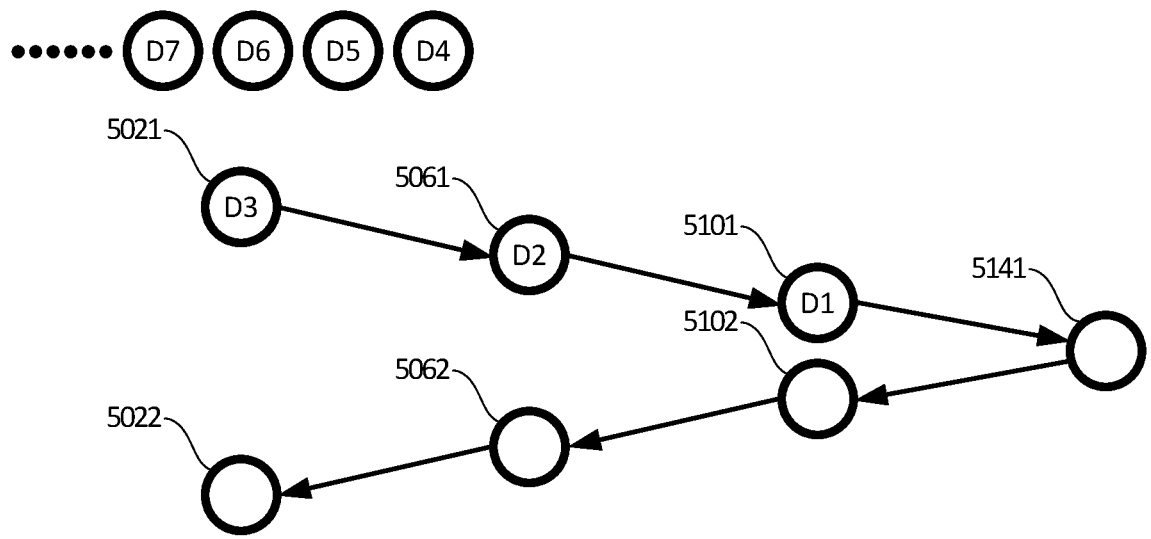

After a second operation cycle, as shown in FIG. 6C, the first data point D1 may move forward from the first hidden neuron 5061 to the second hidden neuron 5101 through the second array of RPU 508. At the same time, the second data point D2 may move forward from the first input neuron 5021 to the first hidden neuron 5061 through the first array of RPU 504, and the third data point D3 is fed to the first input neuron 5021.

Figure 6D:
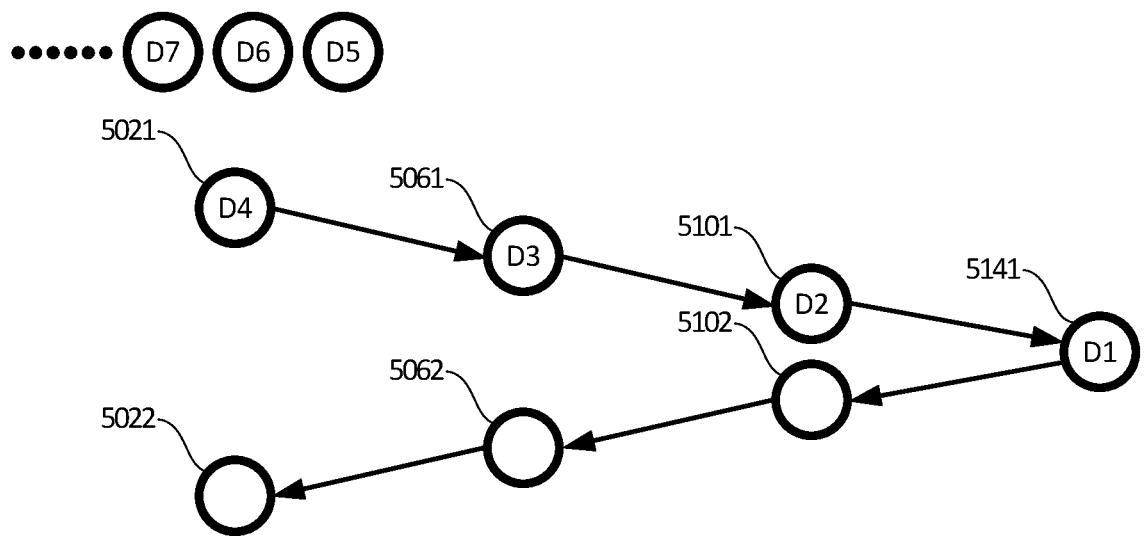

After a third operation cycle, as shown in FIG. 6D, the first data point D1 may move forward from the second hidden neuron 5101 to the output neuron 5141 through the third array of RPU 512. At the same time, the second data point D2 may move forward from the first hidden neuron 5061 to the second hidden neuron 5101 through the second array of RPU 508, the third data point D3 may move forward from the first input neuron 5021 to the first hidden neuron 5061, and the fourth data point D4 is fed to the first input neuron 5021. At this point (after three operation cycles), the first data point D1 completed feed forward and the neuron control system 102 may switch to back propagation mode for D1, and may continue feed forward mode for D2, D3, and D4.

Figure 6E:
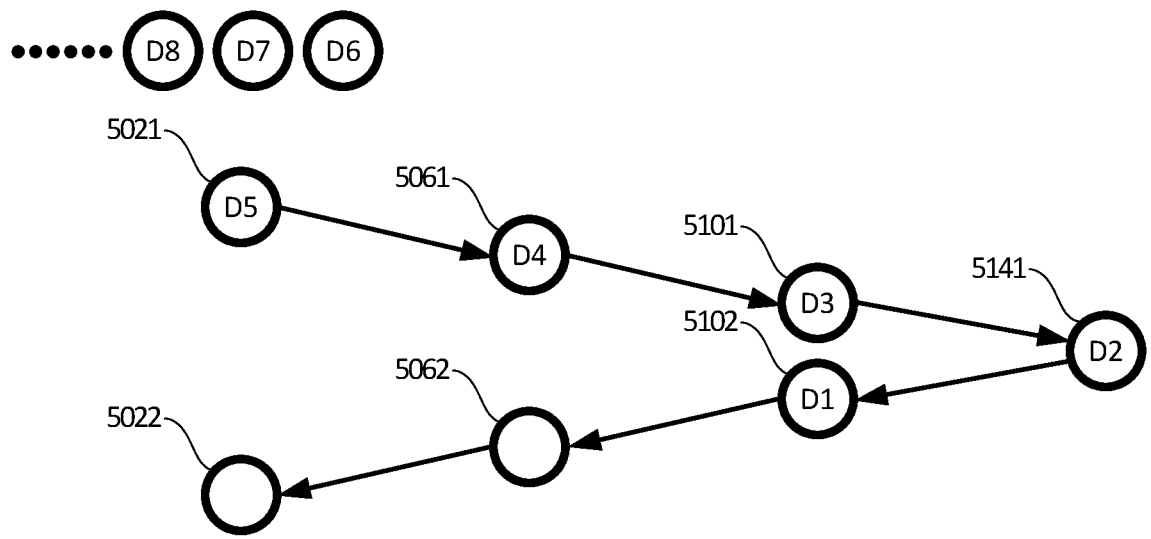

After a fourth operation cycle, as shown in FIG. 6E, the first data point D1 may move backward from the output neuron 5141 to the second hidden neuron 5102 through the third array of RPU 512. At the same time, the second data point D2 may move forward from the second hidden neuron 5101 to the output neuron 5141 through the third array of RPU 512, the third data point D3 may move forward from the first hidden neuron 5061 to the second hidden neuron 5101 through the second array of RPU 508, the fourth data point D4 may move forward from the first input neuron 5021 to the first hidden neuron 5061 through the first array of RPU 504, the fifth data point D5 is fed to the first input neuron 5021. At this point (after four operation cycles), the second data point D2 completed feed forward and the neuron control system 102 may switch to back propagation mode for the second data point D2, and may continue feed forward mode for D3, D4 and D5.

Figure 6F:
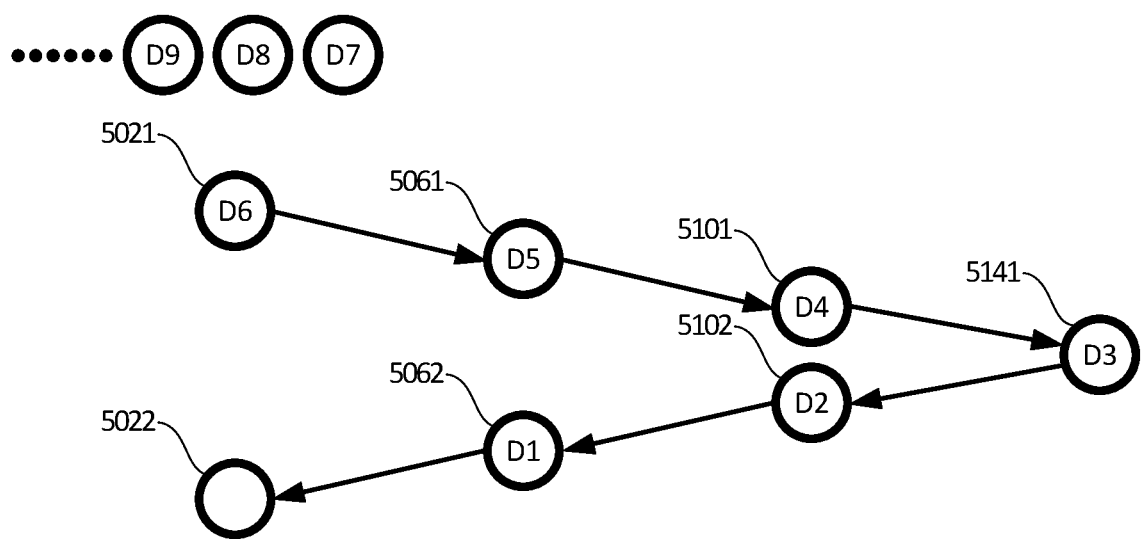

After a fifth operation cycle, as shown in FIG. 6F, the first data point D1 may move backward from the second hidden neuron 5102 to the first hidden neuron 5062 through the second array of RPU 508. At the same time, the second data point D2 may move backward from the output neuron 5141 to the second hidden neuron 5102 through the third array of RPU 512, the third data point D3 may move forward from the second hidden neuron 5101 to the output neuron 5141 through the third array of RPU 512, the fourth data point D4 may move forward from the first hidden neuron 5061 to the second hidden neuron 5101 through the second array of RPU 508, the fifth data point D5 may move forward from the first input neuron 5021 to the first hidden neuron 5061 through the first array of RPU 504, and the sixth data point D6 is fed to the first input neuron 5021. At this point (after five operation cycles), the third data point D3 completed feed forward and the neuron control system 102 may switch to back propagation mode for the third data point D3, and may continue feed forward mode for D4, D5 and D6.

Figure 6G:
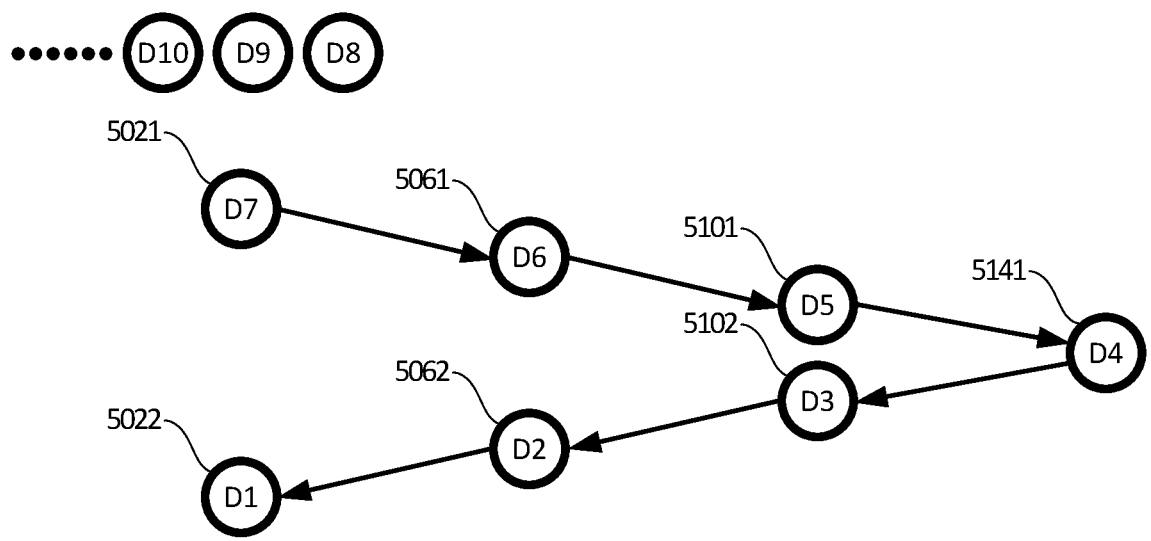

After a sixth operation cycle, as shown in FIG. 6G, the first data point D1 may move backward from the first hidden neuron 5062 to the first input neuron 5022 through the first array of RPU 504. At the same time, the second data point D2 may move backward from the second hidden neuron 5102 to the first hidden neuron 5062 through the second array of RPU 508, the third data point D3 may move backward from the output neuron 5141 to the second hidden neuron 5101 through the third array of RPU 512, the fourth data point D4 may move forward from the second hidden neuron 5101 to the output neuron 5141 through the third array of RPU 512, the fifth data point D5 may move forward from the first hidden neuron 5061 to the second hidden neuron 5101 through the second array of RPU 508, the sixth data point D6 may move forward from the first input neuron 5021 to the first hidden neuron 5061 through the first array of RPU 504, and the seventh data point D7 is fed to the first input neuron 5021. At this point (after six operation cycles), the fourth data point D4 completed feed forward and the neuron control system 102 may switch to back propagation mode for the fourth data point D4, and may continue feed forward mode for D5, D6 and D7.

Figure 6H:
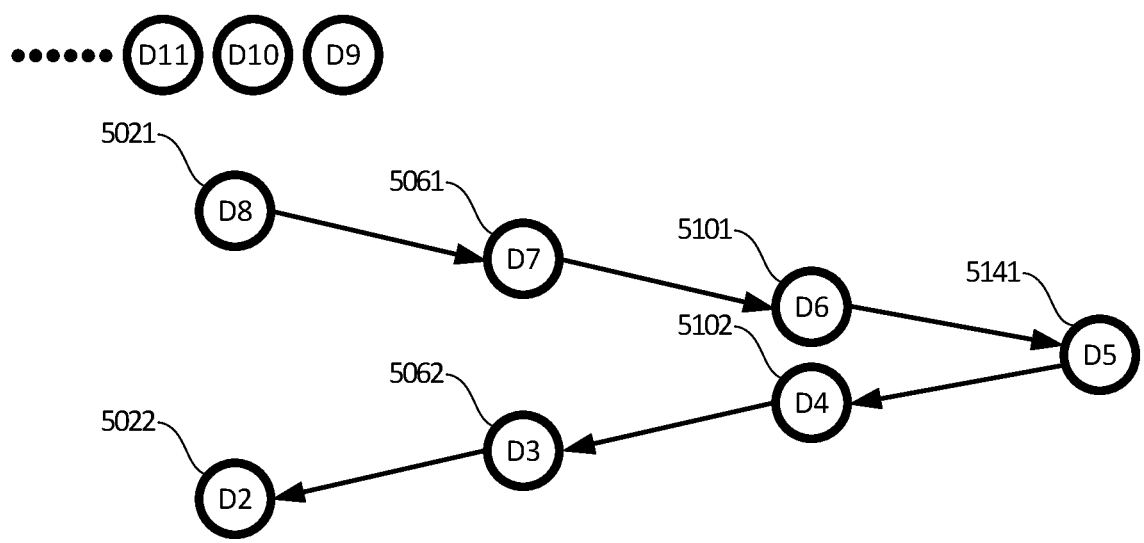

After a seventh operation cycle, as shown in FIG. 6H, the first data point D1 completed one iteration of neural network training, and the weights of the neural network 500 is updated, and the first data point D1 may move out of the neural network 500. In the meantime, the second data point D2 may move backward from the first hidden neuron 5062 to the first input neuron 5022 through the first array of RPU 504, the third data point D3 may move backward from the second hidden neuron 5102 to the first hidden neuron 5062 through the second array of RPU 508, the fourth data point D4 may move backward from the output neuron 5141 to the second hidden neuron 5101 through the third array of RPU 512, the fifth data point D5 may move forward from the second hidden neuron 5101 to the output neuron 5141 through the third array of RPU 512, the sixth data point D6 may move forward from the first hidden neuron 5061 to the second hidden neuron 5101 through the second array of RPU 508, the seventh data point D7 may move forward from the first input neuron 5021 to the first hidden neuron 5061 through the first array of RPU 504, and the eighth data point D8 is fed to the first input neuron 5021. At this point (after seven operation cycles), the fifth data point D5 completed feed forward and the neuron control system 102 may switch to back propagation mode for the fifth data point D5, and may continue feed forward mode for D6, D7 and D8.

In certain embodiments, the process shown in FIGS. 6A-6H continues until each data point goes through a predetermined iteration of neural network training. Although the neural network training for each data point still takes about seven operation cycles to complete, the data points D1, through DN are fed to the input neuron 502 in sequence, one after another at each operation cycle, once the first data point D1 completes its first iteration of neural network training, each neuron, including the input neurons, the output neurons and the hidden neurons, is engaged in the neural network training all the time until the completion of the neural network training. Such a pipelined neural network structure may increase the efficiency of the neural network training, and greatly reduce the neural network training time.

Figure 7:
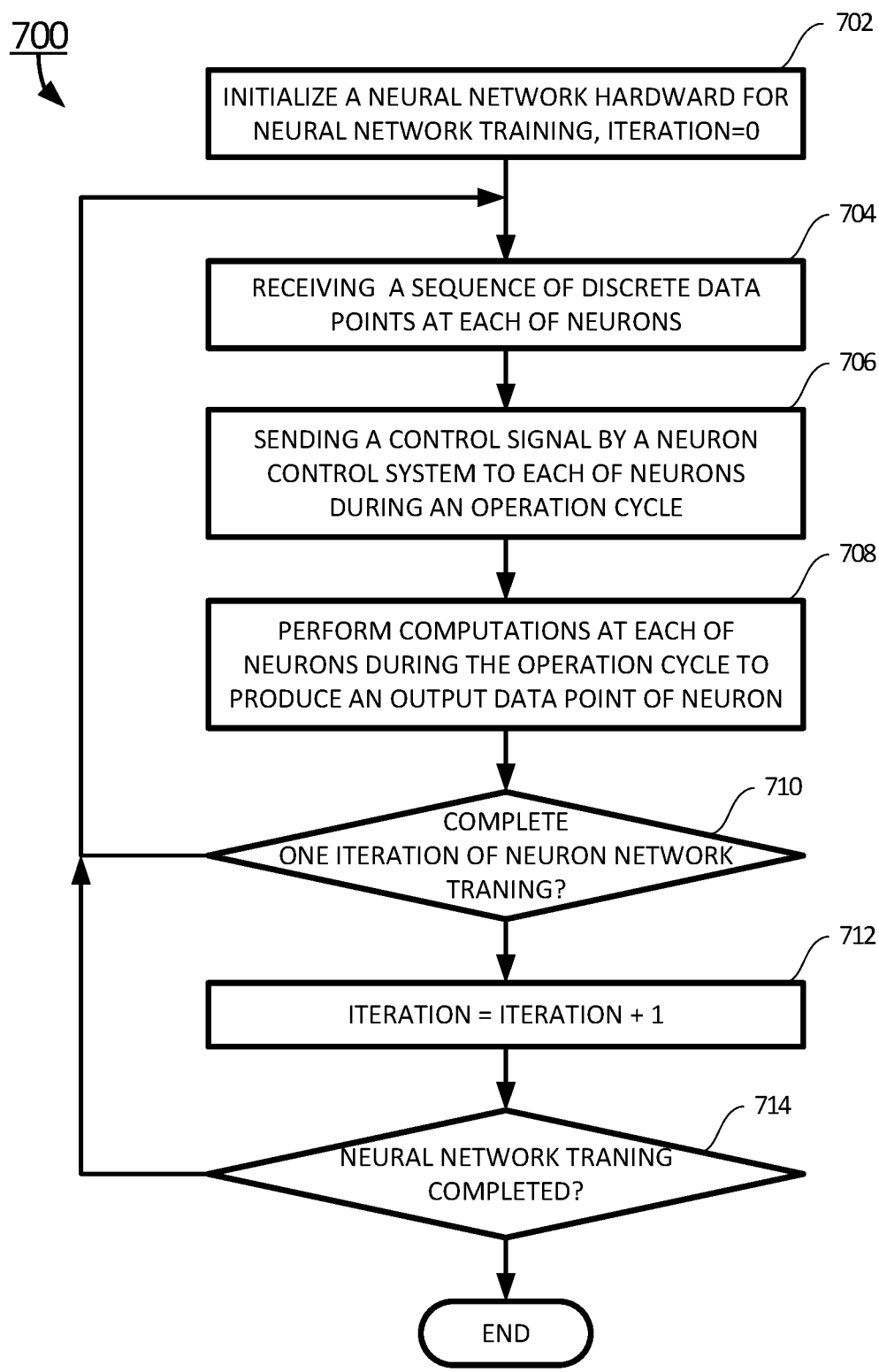
FIG. 7 is a flow chart of the method of pipelined architecture with resistive processing units for neural network training.

In another aspect, the embodiments include a neural network training method. Referring now to FIG. 7, a method 700 of a pipelined neural network training is shown according to certain embodiments.

At block 702, the method 700 may initialize a neural network hardware. In certain embodiments, the neural network hardware may include certain layers of neurons, certain arrays of weights, and a neuron control system. In certain embodiments, the certain layers of neurons may include a layer of input neurons, one or more layers of hidden neurons, and a layer of output neurons. Each array of weights may be configured to receive a sequence of discrete data points from a first layer of neurons and to produce a corresponding discrete data point to a second layer of neurons during a feed forward operation. Each array of weights may include certain resistive processing units (RPU) having respective settable resistances. In certain embodiments, the arrays of weights may be initialized to a predetermined values obtained through other neural network training.

In certain embodiments, the neuron control system may be configured to control an operation mode of each of the neurons. The operation mode of neurons may include: a feed forward mode, a back propagation mode, and a weight update mode.

In certain embodiments, a sequence of data points is received at an input neuron, each of the data points may traverse in a feed forward direction to an output neuron, and then propagate from the output neuron towards the input neuron. Once the data point reaches the input neuron, certain weight update generators may generate weight update along a path of the data point, and may update the respective weight values. Once the weight updates are completed, one iteration of neural network training is completed. In certain embodiments, the neural network training may be terminated when an output error is below a predetermined threshold. In other embodiments, the neural network training may be terminated when a predetermined number of iterations of neural network training is performed, based on other satisfactory neural network training results. In this case, the method 700 may initialize an iteration counter to zero, and increment the iteration counter when each iteration of neural network training is completed until the iteration counter reaches the predetermined number of iterations.

At block 704, each of the neurons may receive a sequence of discrete data points simultaneously, one discrete data point during an operation cycle. The input data points are fed through the layer of input neurons. The intermediate results are fed to each neuron. At each operation cycle, every neuron is processing a data point. In certain embodiments, the discrete data point may include an input current from an input of the neuron, and an output voltage pulse at an output of the neuron.

At block 706, the neuron control system may send out a control signal to each of the neurons based on a location of the neuron and a discrete data point associated with the neuron at the operation cycle to control an operation mode of the neuron. In certain embodiments, the operation mode of the neuron may include a feed forward mode, a back propagation mode and a weight update mode.

In certain embodiments, the neuron control system may place a neuron in the feed forward mode when the neuron is an input neuron, or the neuron receives the associated data point in a feed forward chain. The neuron control system may place a neuron in the back propagation mode when the neuron is an output neuron, or the neuron receives the associated data point in a back propagation chain. The neuron control system may place a neuron in the weight update mode when the neuron is an input neuron and the neuron receives the associated data point in a back propagation chain.

At block 708, the method 700 may perform computations at each of the neurons during the operation cycle to produce an output data point of the neuron. In certain embodiments, a feed forward computation is performed for each of neurons in the feed forward mode, a back propagation computation is performed for each of the neurons in the back propagation mode, and a weight update computation is performed for each of the neurons in the weight update mode.

At query block 710, the method 700 may check if one iteration of neural network training is completed. Each of the data points may traverse in a feed forward direction to an output neuron, and then propagate from the output neuron towards the input neuron. Once the data point reaches the input neuron after the back propagation operation, certain weight update generators may generate weight update along a path of the data point, and may update the respective weight values. Once the weight updates are completed, one iteration of neural network training is completed.

In certain embodiments, when one iteration is not completed for the sequence of data points received at the input neurons, the method 700 may loop back to block 704 to process the next data point. When one iteration is completed for the sequence of data points received at the input neurons, the method 700 may proceed to block 712 to increment the iteration counter and continue neural network training.

At block 714, the method 700 may check whether the neural network training is completed. In certain embodiments, the neural network training may be terminated when output errors at the layer of output neurons are below a predetermined threshold. In this case, the method 700 may proceed to compare the output errors with the predetermined threshold. When the output errors are less than the predetermined threshold, the neural network training may be terminated.

In certain embodiments, the neural network training may be terminated when a predetermined number of iterations of neural network training is performed, based on other satisfactory neural network training results. In this case, the method 700 may compare the iteration counter to the predetermined number of iterations. Once iteration counter reaches the predetermined number of iterations, the neural network training is completed. Otherwise, the method 700 loops back to block 704 to continue the neural network training until the iteration counter reaches the predetermined number of iterations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural network system, comprising: a plurality of neurons comprising a layer of input neurons, one or more layers of hidden neurons, and a layer of output neurons; a plurality of arrays of weights, each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances; and a neuron control system configured to control an operation mode of each of the plurality of neurons, wherein the operation mode comprises: a feed forward mode, a back propagation mode, and a weight update mode, one or more hidden neurons in the one or more layers of hidden neurons comprising a first storage associated with the feed forward mode and a second storage associated with the back propagation mode, the one or more hidden neurons comprising a feed forward generator and a weight update generator both of which are coupled to the first storage and a back propagation generator and another weight update generator both of which are coupled to the second storage, the first storage being different from the second storage.

2. The neural network system of claim 1, wherein each of the plurality of neurons comprises: a feed forward chain configured to apply a computation based on an input data point from an input of the neuron and to produce a result of the computation as an output data point at an output of the neuron; a back propagation chain configured to apply a computation based on an error data point and a derivative of the computation of the feed forward chain from the input of the neuron and to produce an error data point at the output of the neuron; and one or more weight update generators configured to produce a weight update data point in accordance with a local error value.

3. The neural network system of claim 2, wherein each of the plurality of neurons is associated with a data point, wherein the associated data point is currently processed by the neuron, and the data point comprises an input current from the input of the neuron, and an output voltage pulse at the output of the neuron.

4. The neural network system of claim 3, wherein the neuron control system performs: placing a neuron in the feed forward mode when the neuron is an input neuron, or the neuron receives the associated data point in a feed forward chain; placing a neuron in the back propagation mode when the neuron is an output neuron, or the neuron receives the associated data point in a back propagation chain; and placing a neuron in the weight update mode when the neuron is the input neuron and the neuron receives the associated data point in a back propagation chain.

5. The neural network system of claim 3, wherein each of the one or more layers of hidden neurons is configured to produce a weight update voltage pulse to an array of weights in a forward direction and an array of weights in a backward direction.

6. The neural network system of claim 5, wherein the weight update voltage pulse comprises a stochastic number encoded as a voltage pulse that has a magnitude half needed to change the settable resistance of a resistive processing unit.

7. The neural network system of claim 6, wherein weight update voltage pulses from two neurons converge on a resistive processing unit during weight update mode and change the settable resistance of the resistive processing unit in proportion to a number of points in the respective stochastic numbers that both have a voltage magnitude.

8. The neural network system of claim 3, wherein the input current is compared to a reference current to determine a sign and magnitude of an input to the computation.

9. The neural network system of claim 1, wherein each array of weights further comprises one or more reference weights having a static resistance; and wherein the operation mode is configured to operate concurrently in the feed forward mode, the back propagation mode, and the weight update mode by separately using the first storage with the feed forward mode and the second storage with the back propagation mode.

10. The neural network system of claim 1, wherein each array of weights applies the voltage pulse from each of the first layer of neurons to an entire row or column of resistive processing units in parallel.

11. The neural network system of claim 1, wherein each array of weights sums currents from an entire row or column of resistive processing units to form an output current.

12. The neural network system of claim 1, wherein one or more of the input neurons and hidden neurons is a constant neuron configured to provide a constant voltage output during feed forward operation.

13. A method of performing neural network training, comprising: initializing a neural network hardware having a plurality of neurons, a plurality of arrays of weights, and a neuron control system, wherein the plurality of neurons comprises a layer of input neurons, one or more layers of hidden neurons, and a layer of output neurons, and each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances; receiving, at each of the plurality of neurons, a sequence of discrete data points, one discrete data point during each of a plurality of operation cycles, wherein the discrete data point comprises an input current from an input of the neuron, and an output voltage pulse at an output of the neuron; sending, by the neuron control system, a control signal to each of the plurality of neurons based on a location of the neuron and a discrete data point associated with the neuron at the operation cycle to control an operation mode of the neuron, wherein the operation mode of the neuron comprises a feed forward mode, a back propagation mode and a weight update mode, one or more hidden neurons in the one or more layers of hidden neurons comprising a first storage associated with the feed forward mode and a second storage associated with the back propagation mode, the one or more hidden neurons comprising a feed forward generator and a weight update generator both of which are coupled to the first storage and a back propagation generator and another weight update generator both of which are coupled to the second storage, the first storage being different from the second storage; performing computations at each of the plurality of neurons during the operation cycle to produce an output data point of the neuron; completing one iteration of neural network training when each of the sequence of discrete data points at each of the layer of input neurons has been processed through feed forward operation, back propagation operation, and weight update operation; and completing the neural network training when a predetermined termination condition is met.

14. The method of claim 13, wherein each of the plurality of neurons comprises: a feed forward chain configured to apply a computation based on an input data point from an input of the neuron and to produce a result of the computation as an output data point at an output of the neuron; a back propagation chain configured to apply a computation based on an error data point and a derivative of the computation of the feed forward chain from the input of the neuron and to produce an error data point at the output of the neuron; and one or more weight update generators configured to produce a weight update data point in accordance with a local error value.

15. The method of claim 13, wherein each of the plurality of neurons is associated with a data point, wherein the associated data point is currently processed by the neuron, and the data point comprises an input current from the input, and an output voltage pulse at the output.

16. The method of claim 13, wherein the neuron control system performs: placing a neuron in the feed forward mode when the neuron is an input neuron, or the neuron receives the associated data point in a feed forward chain; placing a neuron in the back propagation mode when the neuron is an output neuron, or the neuron receives the associated data point in a back propagation chain; and placing a neuron in the weight update mode when the neuron is an input neuron and the neuron receives the associated data point in a back propagation chain.

17. The method of claim 13, wherein each of the one or more layers of hidden neurons is configured to produce a weight update voltage pulse to an array of weights in a forward direction and an array of weights in a backward direction.

18. The method of claim 17, wherein the weight update voltage pulse comprises a stochastic number encoded as a voltage pulse that has a magnitude of half needed to change the settable resistance of a resistive processing unit.

19. The method of claim 17, wherein weight update voltage pulses from two neurons converge on a resistive processing unit during weight update mode and change the settable resistance of the resistive processing unit in proportion to a number of points in the respective stochastic numbers that both have a voltage magnitude.

20. A computer program product comprising a computer readable storage medium having program instructions embodied therewith, the program instructions executable by a processor to cause the processor to perform a method comprising: initializing a neural network hardware having a plurality of neurons, a plurality of arrays of weights, and a neuron control system, wherein the plurality of neurons comprises a layer of input neurons, one or more layers of hidden neurons, and a layer of output neurons, and each array of weights being configured to receive a plurality of discrete data points from a first layer of neurons and to produce a corresponding discrete data point to a second layer of neurons during a feed forward operation, each array of weights comprising a plurality of resistive processing units (RPU) having respective settable resistances; receiving, at each of the plurality of neurons, a sequence of discrete data points, one discrete data point during each of a plurality of operation cycles, wherein the discrete data point comprises an input current from an input of the neuron, and an output voltage pulse at an output of the neuron; sending, by the neuron control system, a control signal to each of the plurality of neurons based on a location of the neuron and a discrete data point associated with the neuron at the operation cycle to control an operation mode of the neuron, wherein the operation mode of the neuron comprises a feed forward mode, a back propagation mode and a weight update mode, one or more hidden neurons in the one or more layers of hidden neurons comprising a first storage associated with the feed forward mode and a second storage associated with the back propagation mode, the one or more hidden neurons comprising a feed forward generator and a weight update generator both of which are coupled to the first storage and a back propagation generator and another weight update generator both of which are coupled to the second storage, the first storage being different from the second storage; performing computations at each of the plurality of neurons during the operation cycle to produce an output data point of the neuron; completing one iteration of neural network training when each of the sequence of discrete data points at each of the layer of input neurons has been processed through feed forward operation, back propagation operation, and weight update operation; and completing the neural network training when a predetermined termination condition is met.

* * * * *